July 12, 1949.　　　　W. T. KIPP　　　　2,475,901
SUN VISOR

Filed Feb. 9, 1948　　　　　　　　　　2 Sheets-Sheet 1

William T. Kipp
INVENTOR.

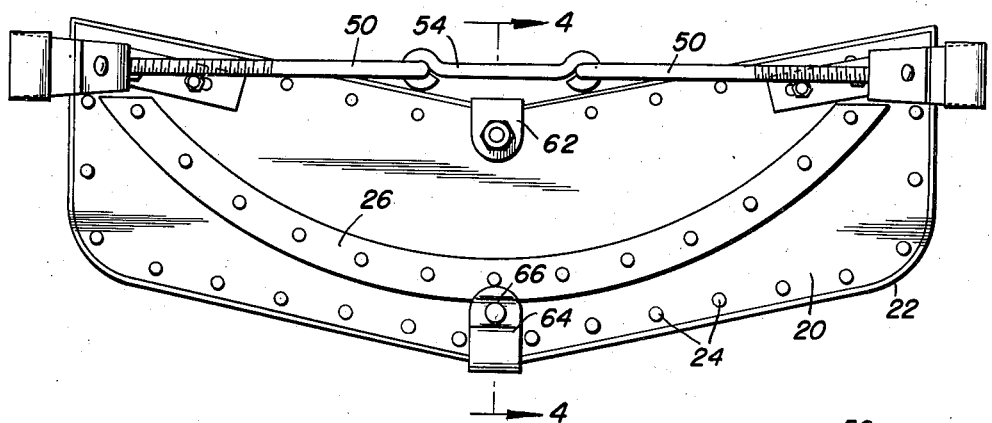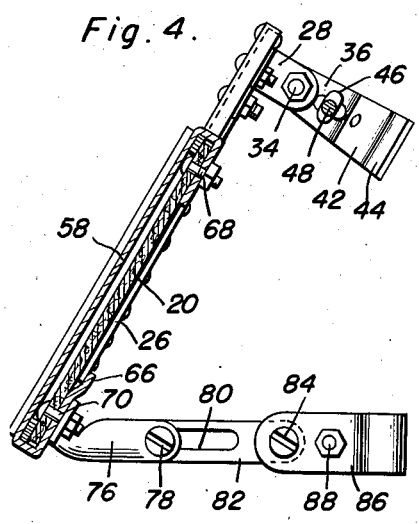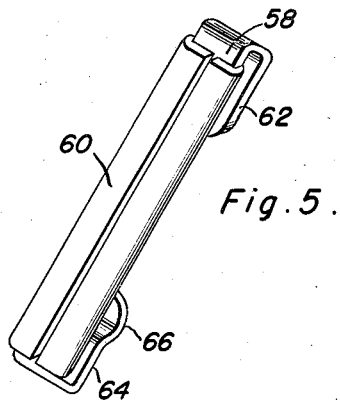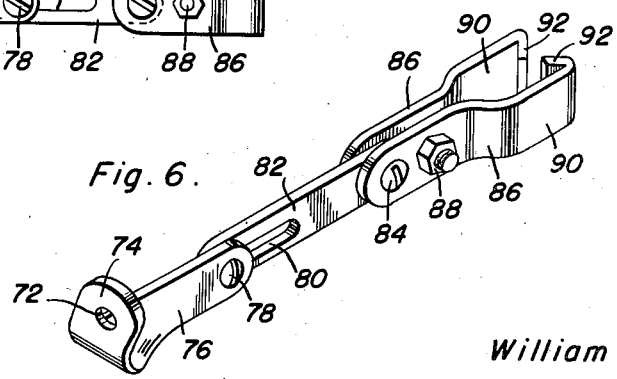

Patented July 12, 1949

2,475,901

UNITED STATES PATENT OFFICE 2,475,901

SUN VISOR

William T. Kipp, Piqua, Kans.

Application February 9, 1948, Serial No. 7,230

1 Claim. (Cl. 296—95)

This invention comprises novel and useful improvements in a sun visor and more specifically pertains to a windshield visor for motor vehicles.

The primary object of this invention is to provide a visor for the windshields of motor vehicles for protecting the same from snow falling thereon, and for shielding the windshields from the glare of the sun and the like.

An important feature of the invention resides in the provision of an opaque panel, which is mounted above and extends across and overlies the windshield of a motor vehicle, and which is pivotally mounted at its ends whereby the same may be raised or lowered to vary its inclination with respect to the windshield.

A further important feature of the invention resides in the provision of an improved means for pivotally mounting and supporting the opaque panel of the visor from suitable parts which are common to automotive vehicles.

Yet another feature of the invention resides in the provision of novel bracing and reinforcing means for lending rigidity and strength to the sun visor and for adjustably mounting and supporting the same upon a vehicle.

And a further important feature of the invention to be specifically enumerated herein, resides in the provision of a windshield visor which shall be of light weight, inexpensive construction, readily applied to or removed from a motor vehicle and which is inherently capable of ready adaptation to various sizes and types of vehicle windshields.

These, together with various ancillary features and objects of the invention which will later become apparent as the following description proceeds, are attained by this device, the preferred embodiment of which has been illustrated by way of example only in the accompanying drawings, wherein:

Figure 3 is a lower plan view of the visor;

Figure 4 is a vertical transverse sectional view taken substantially upon the plane of section line 4—4 of Figure 1, parts being shown in elevation;

Figure 5 is a perspective view of a reinforcing clip forming a part of the invention;

Figure 6 is a perspective view of a brace forming a part of the invention; and

Figure 1:
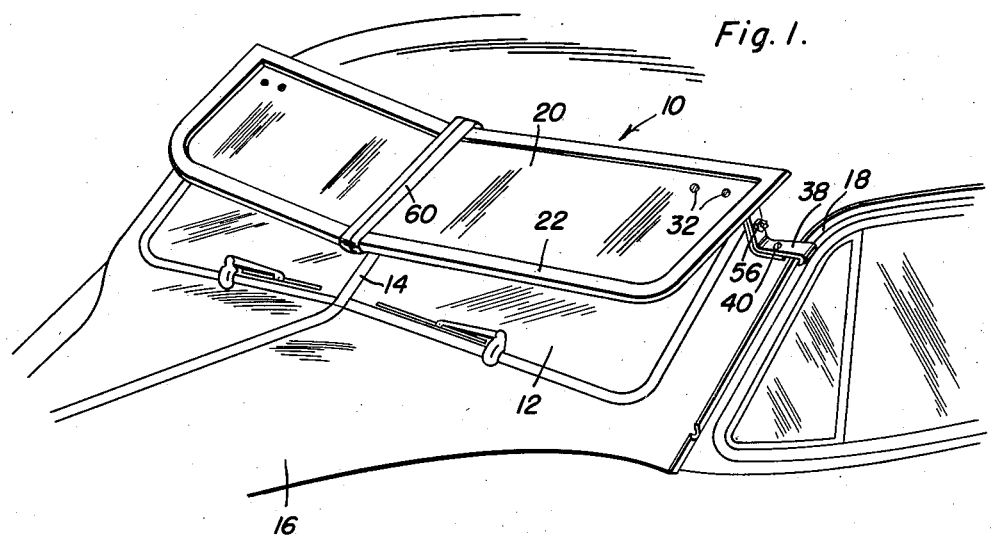
Figure 1 is a perspective view showing the improved sun visor mounted on a motor vehicle in operative position.

Referring now more specifically to the drawings, wherein like numerals designate similar parts throughout the various views, attention is directed first to Figure 1, wherein numeral 10 indicates in its entirety the improved sun visor forming the subject of this invention. As shown, this visor is mounted in operative position above a windshield 12 which is preferably of the conventional type having a center strip 14 forming a part of the frame and for dividing the windshield into two angularly related glass windows. A portion of the motor vehicle is shown in Figure 1 and indicated by the numeral 16, this vehicle having cornices 18 adjacent the door openings, which cornices are relied upon for clamping the visor therebetween.

As shown best by Figures 1 and 3, the sun visor includes an opaque panel 20 of any suitable material such as Masonite, or other composition, which is provided upon its upper surface with a reinforcing metallic rim 22, secured as by rivets or screws 24. On the under surface of the visor, is provided a reinforcing strip 26 of arcuate shape and preferably of metallic structure, which is secured to the panel by any suitable fastening means such as rivets, bolts or the like.

The sun visor is detachably secured above and overlying the windshield of various types of automotive vehicles by means of clamps secured to the ends of the visor at opposite sides thereof, which clamps provide for relative longitudinal adjustment of the visor upon the vehicle, as well as pivotal movement of the visor with respect to the windshield.

Figure 2:
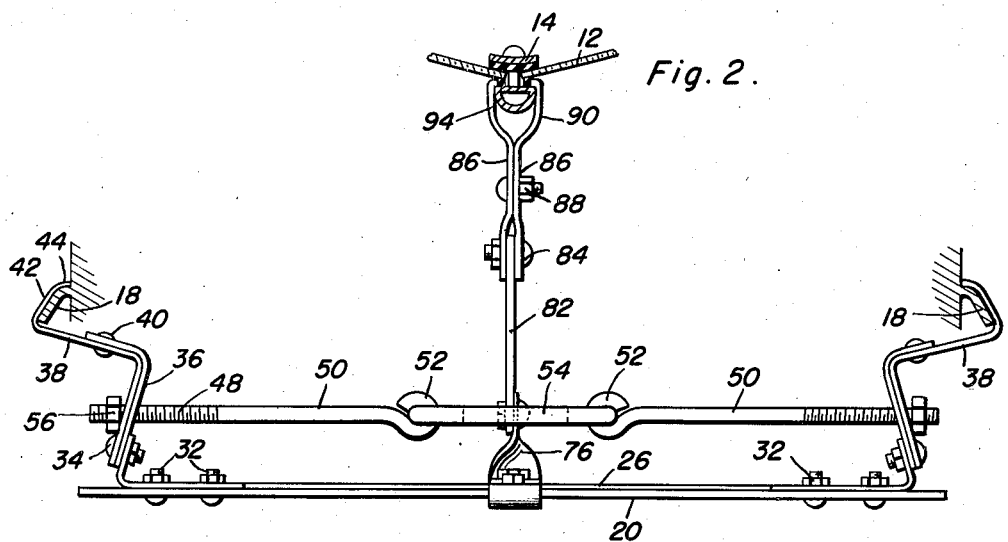
Figure 2 is a rear elevational view looking down upon the visor from above the top of the vehicle and from the rear end of the visor.
Figure 7:
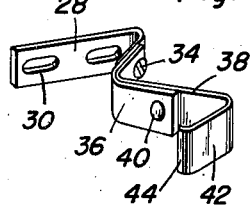
Figure 7 is a further perspective view of one of the fastening clamps of the device.

These clamps, which are shown best in Figures 2 and 7, consist of an angle bracket 28 one leg of which is provided with a pair of elongated slots 30 which by means of bolts 32 may be secured to the under surface of the visor panel. The other leg of the bracket 28 is pivotally attached by fastening bolts 34 to an angle bracket 36 constituting a stiffening member, and likewise to a Z-shaped bracket 38, one of whose ends is fastened to the fastener 34, and the other end and the mid-portion of which is secured as by a rivet or screw 40 to the other leg of the angle member 36. The other extremity of the Z-shape member 38 is turned as at 42 and further provided with an inturned limb 44, whereby the clamp may be engaged upon the cornice 18 in the manner shown in Figure 2. Obviously, the elongated slots 30 permit the clamps to be adjusted longitudinally of the opaque panel 20, of the fastening means 34 permit pivotal movement of the members 36 and 38 and the panel upon the relatively stationary portion 28 of the clamp, whereby the visor may be angularly adjusted relative to the windshield 12.

As shown more clearly in Figure 4, those legs of the members 36 and 38 which are secured to the bracket 28 by the fastening means 34, or further apertured as at 46 to receive the screw threaded extremity 48 of a tie rod, which includes end members 50 having eyes 52 which are connected by a link member 54. Fastening bolts 56 engage the screw threaded end 48 for drawing the clamps together in tight engagement upon the cornices 18 to thereby secure the visor in place.

A reinforcing clip, the construction of which is shown best in Figure 5, consists of a narrow strip 58 of metal or other suitable material, upon the main portion of which is provided a covering 60 of a cushioning material such as sponge rubber or the like, this strip having its ends turned as at 62 and 64 respectively; the latter being provided with an offset portion 66. This strip, as shown in Figures 1 and 4 is disposed transversely of the opaque panel 20 at its mid point, and overlies the upper surface of the panel and has its extremities embracing the upper and lower edges of the panel in clamping relation thereto. Suitable fastening means 68 and 70 are provided for securing the panel to the inturned portions 62 and 64, the fastening means 70 also extending through an aperture 72 in the inturn end 74 of a first end member 76 of a brace for the visor. This brace consists of three sections, namely a pair of ends and an intermediate member joined thereto. The first end 76 is pivotally secured as by a fastening means 78 to an elongated slot 80 in the intermediate section 82, while the latter is pivoted as by fastening means 84 between a pair of members 86 constituting the other end section, these members 86 being adjustably tightened as by a bolt 88 extending therethrough. The outer extremities of the members 86 are laterally offset to provide jaws 90 having inturned extremities 92. As shown in Figure 2, these inturned extremities are adapted to seat beneath a fastening bolt 94 by means of which the center strip 14 is secured to the rest of the windshield frame. It will thus be seen that this brace is rigidly attached to the center strip of the windshield, and also is rigidly attached to the lower end of the sun visor, but by means of elongated slots 80 and the two pivotal connections 78 and 84, permits ready adjustment of the visor panel 20 upon its supporting brackets previously described.

From the foregoing, it is thought that the construction of the device will be readily understood. The opaque panel of the visor 20 may obviously be of any desired material, and preferably is of extremely light weight, the necessary rigidity and strength being imparted by the arcuate metallic reinforcing strip 26, by the metallic marginal rim 22 and by the transverse reinforcing clip 50. The device is readily adapted to different sizes and widths of automotive vehicle windshields by means of the longitudinal adjustments which are permitted by the clamps, as well as by the adjustment of the tie rod members.

It will thus be seen that the device may be readily installed without the necessity of making any changes in existing automotive construction, but by utilizing conventional constructional features thereof for securely mounting the device thereon, readily adjusting the device and then fastening the same in adjusted position.

Since numerous modifications and changes will readily occur to those skilled in the art and for a consideration of the foregoing specification and accompanying drawings, it is obviously not intended to limit the invention to the exact construction shown and described, but all suitable modifications and equivalents may be resorted to falling within the scope of the appended claim.

Having described the invention, what is claimed as new is:

A windshield visor including an opaque panel, clamps secured to opposite ends of said panel for attachment to the body portion of an automobile, each of said clamps including a pivotal connection, said panel being mounted above and overlying the windshield of a vehicle, a transversely extending clip on the upper surface and intermediate the ends of said panel, said clip having a cushioning covering and inturned terminals embracing the upper and lower edges of said panel.

WILLIAM T. KIPP.

REFERENCES CITED

The following references are of record in the file of this patent:

UNITED STATES PATENTS

| Number | Name | Date |
| --- | --- | --- |
| 1,482,078 | Hiatt | Jan. 29, 1924 |
| 2,207,227 | Scott | July 9, 1940 |
| 2,253,353 | Sharp | Aug. 19, 1941 |
| 2,334,856 | Atkinson | Nov. 23, 1943 |